United States Patent [19]

Shapiro et al.

[11] Patent Number: 4,643,453
[45] Date of Patent: Feb. 17, 1987

[54] CREDIT CARD SECURITY SYSTEM

[76] Inventors: Sanford S. Shapiro, 20951 Ingomar St., Canoga Park, Calif. 91304; Mayroma Avishur, 22212 Valerio St., Canoga Park, Calif. 91303

[21] Appl. No.: 700,098

[22] Filed: Feb. 11, 1985

[51] Int. Cl.[4] .......................... B42D 15/00; G06K 5/00
[52] U.S. Cl. ......................................... 283/73; 283/58; 235/380
[58] Field of Search ................ 283/58, 70, 72, 73, 283/74, 93; 235/380, 432, 487, 490, 494; 282/1 R, 9 R; 101/4, 32, DIG. 18; 400/127

[56] References Cited

U.S. PATENT DOCUMENTS

| | | | |
|---|---|---|---|
| 1,538,289 | 5/1925 | Larter | 283/58 |
| 3,075,791 | 1/1963 | Wolf | 283/58 |
| 3,610,889 | 10/1971 | Goldman | 235/380 |
| 3,821,518 | 6/1974 | Miller | 235/490 |
| 4,055,746 | 10/1977 | Peterson | 235/380 |

Primary Examiner—Paul A. Bell
Assistant Examiner—Paul M. Heyrana, Sr.
Attorney, Agent, or Firm—Freilich, Hornbaker, Rosen & Fernandez

[57] ABSTRACT

A credit card and charge slip are provided which resist credit card fraud. The credit card has auxiliary characters and corresponding dates at which each should be used, the auxiliary characters not being embossed at a copy area as are the numbers of the credit card. A merchant finalizes a credit card purchase by writing the auxiliary character only on the bank copy of the credit slip. The credit slip can be formed with aligned holes in all of the sheets except the bank sheet, so a merchant can write the auxiliary character directly on the bank sheet without even partially separating the sheet.

8 Claims, 8 Drawing Figures

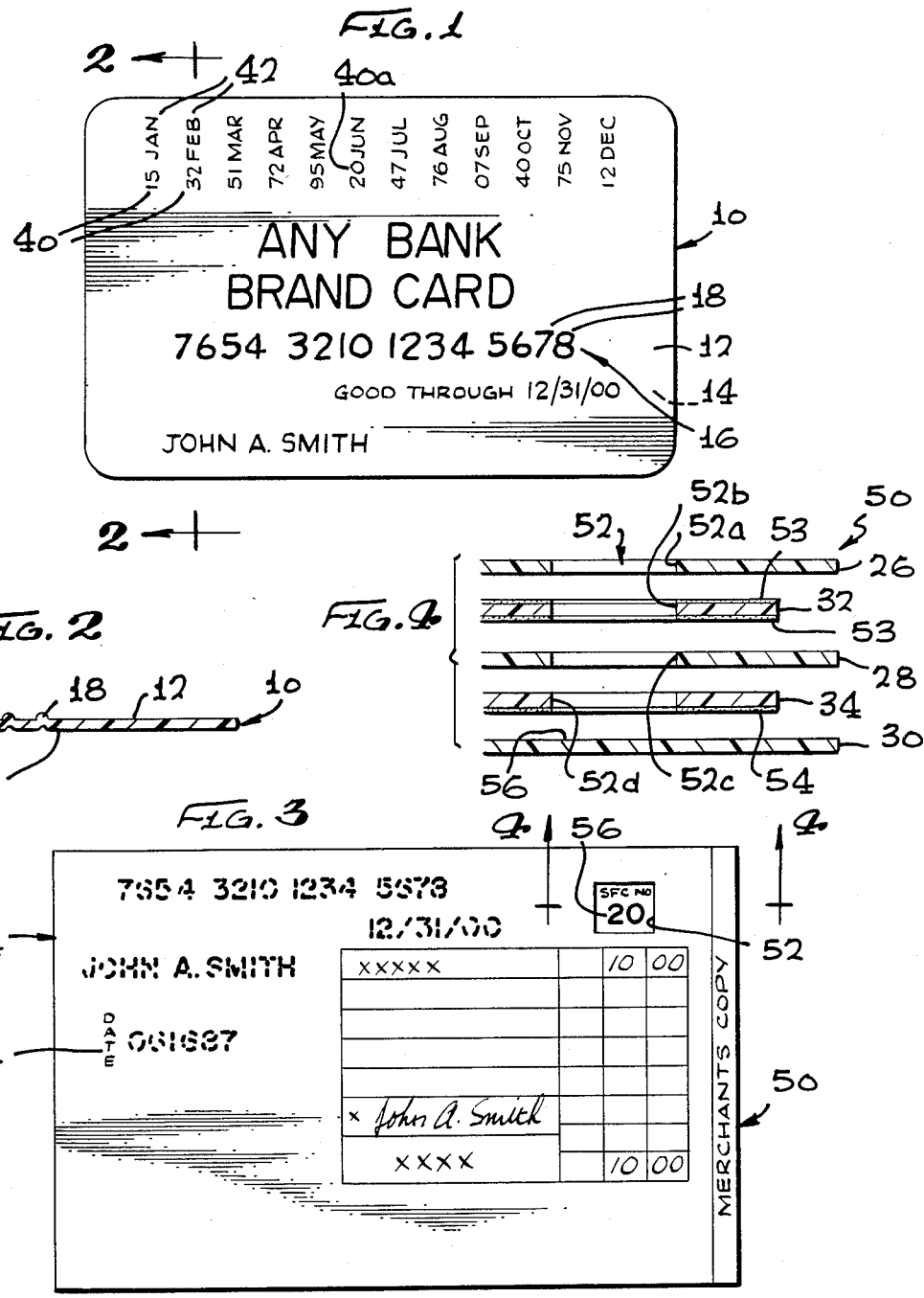

CREDIT CARD SECURITY SYSTEM

BACKGROUND OF THE INVENTION

A large portion of credit card fraud occurs when a swindler obtains the credit card number, expiration date, and name as they appear on a legitimate credit card, and makes a duplicate credit card which is used for fraudulent purchases. The information is often obtained from discarded carbon papers, a discarded customer slip, or from a merchant slip that the merchant keeps indefinitely. Credit cards and credit slips of relatively simple design which resisted access to information necessary to create a counterfeit credit card, would help in reducing credit card fraud.

SUMMARY OF THE INVENTION

In accordance with one embodiment of the present invention, a fraud-resistant credit card apparatus is provided which is of simple design and which resists access to information on legitimate credit cards which is necessary to make a credit card purchase. A credit card of the usual type which has an embossed credit card number as well as the validity date and the holder's name, is provided with auxiliary character markings which do not project from the card surface. The card also has means for assigning a particular calendar period to each auxiliary marking. At the time of a credit purchase, the clerk copies the current auxiliary number onto only the bank sheet of the credit card slip, but not the other sheets. Accordingly, the auxiliary number does not appear on the carbon sheets, the customer sheet, or any additional merchant sheet, to thereby minimize the possibility that an unscrupulous person will have access to the auxiliary number.

The credit card slip can be provided with aligned holes through all of the sheets except the bank sheet which may lie at the bottom. This allows a clerk to project a pen through the aligned holes, so he can print the current auxiliary number directly on the bank sheet without having to lift back the other sheets out of the way.

The novel features of the invention are set forth with particularity in the appended claims. The invention will be best understood from the following description when read in conjunction with the accompanying drawings.

BRIEF DESCRIPTION OF THE DRAWINGS

FIG. 1 is a plan view of a credit card constructed in accordance with one embodiment of the present invention.

FIG. 2 is a view taken on the line 2—2 of FIG. 1.

FIG. 3 is a plan view of a credit slip constructed in accordance with the present invention, showing it filled in.

FIG. 4 is a view taken on the line 4—4 of FIG. 3.

FIG. 5 is a partial exploded perspective view of one common type of prior art charge slip.

DESCRIPTION OF THE PREFERRED EMBODIMENTS

Figure 6:
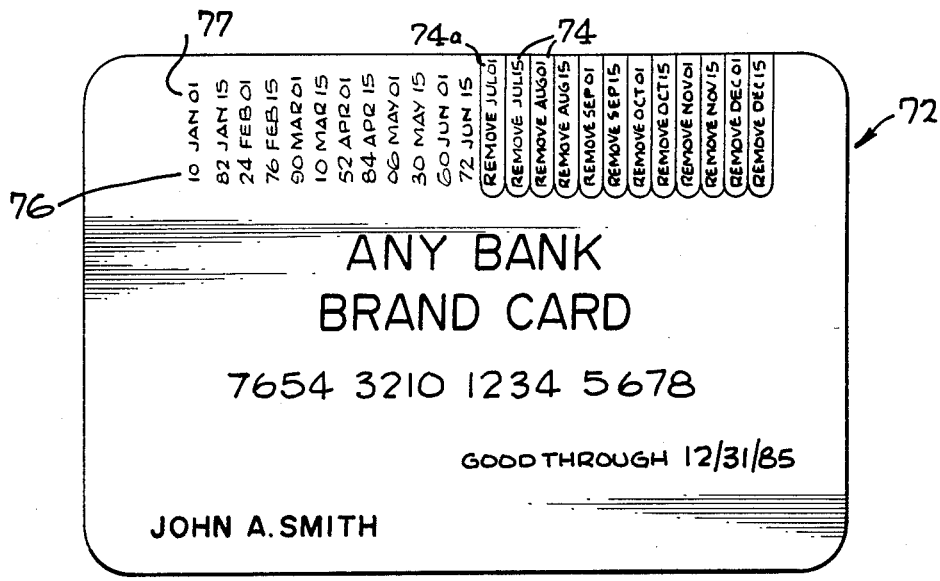
FIG. 6 is a plan view of a credit card constructed in accordance with another embodiment of the invention.

FIG. 1 illustrates a credit card 10 which has front and back flat faces 12, 14 and a credit card or cardholder number 16 embossed thereon. The credit card number forms a plurality of regions 18 that project from the forward face of the card. These projecting regions represent characters, and can be used to mark a slip of paper to form the characters thereon, by pressing the card toward the slip of paper with a carbon copy sheet adjacent to the paper slip.

FIG. 5 illustrates one common type of prior art charge slip. The charge slip includes a merchant record sheet 26C at the top which is retained by the merchant, a customer record sheet 28C whish is retained by the customer, and a bank record sheet 30C which is given by the merchant to his bank to obtain payment. There is also an upper carbon copy sheet 32C which has copy material on its upper face for printing on the back of the merchant sheet 26C, and a lower carbon sheet 34C which has copy material on both of its faces for marking both adjacent sheets 28C and 30C. In typical prior art usage, the card was placed under all sheets of the charge slip C, with the card number lying under an area 36C of the card. A roller squeezed the card and sheets. The pressure applied through the raised areas of the card formed carbon copy sheet markings on all three records sheets 26C, 28C and 30C. Other markings including the last date on which the card was valid and the name of the owner was also marked.

Of the five sheets, 26C-34C, only the bank record copy 30C had to be identified as valid by a bank in order to assure that the merchant was paid. The carbon sheets 32C and 34C were typically shown away by the clerk, and since they bore the imprint of the cardholder's number, they could be used by a swindler to make a counterfeit card that would be acceptable by merchants. It was also possible for unscrupulous individuals to view the merchant record sheet 26C, or even the customer sheet 28C if the customer discarded it.

In accordance with one aspect of the present invention, the credit card 10 of FIG. 1 is provided with a group of auxiliary character markings 40 arranged in a column. An entire credit system will include a large number of cards, each having a unique cardholder number and a substantially unique auxiliary character marking (only one in many cards will have the same auxiliary character marking). The card also has month markings 42, also arranged in a column, that serve as means for indicating a calendar period corresponding with each of the auxiliary character markings 40.

In a particular embodiment shown in FIG. 1, there is a column of twelve auxiliary character markings, each marking 40 including two digits. Each calender period marking 42 contains three letters representing a month of the year, and lies beside an auxiliary character marking 40. Thus, the calendar period marking "JUN" representing the month of June lies beside the auxiliary character marking 40a consisting of the number "20." These auxiliary markings are used by the clerk to mark only the bank record sheet 30C of the credit slip. To do this, the clerk must either lift all of the other sheets and use a pen or pencil to mark the bottommost sheet, or wait until he tears off the bank record sheet before marking it. When this credit card is used, the bank will accept the bank record sheet for payment, only if it contains the proper auxiliary character marking at 44, that corresponds to the period during which that particular auxiliary character marking is valid, that being the month of June in the example of FIG. 1. The machine which presses the card and credit slip together, also has a projection that marks the current date on all the sheets.

By having the clerk mark only the bottommost sheet 30C, the auxiliary marking or number is not marked on either of the two carbon sheets or the other record sheets 26C, 28C. Thus, event if a swindler should find such carbon sheets or record sheets, he will not then know the current auxiliary number that must be used to make a purchase. There will occasionally be an opportunity for a swindler to obtain an auxiliary number corresponding to a particular credit card number. This may happen, for example, if a clerk should not bother to lift the sheets above the bottommost one, but instead merely writes on the uppermost sheet 26C, knowing that this will produce a marking on the lowermost sheet. In order to reduce the possibility that a thief will be able to make use of his knowledge of the auxiliary number for a card, the auxiliary number remains valid only during a limited time period. The card 10 is provided with a group of auxiliary character markings 40 and time period markings 42 corresponding thereto. In the example in FIG. 1, each calendar period marking 42 designates a month, and there are twelve corresponding auxiliary markings 40. In order for a bank to accept a bank record sheet 30C and give credit to the merchant, the bank will require that the proper auxiliary number be marked on its bank copy. Thus, for example, during the month of June only the auxiliary marking "20" at 40a will be valid. The following month, the next auxiliary marking "47" will have to be marked on the bank copy in order to achieve validity.

Although the auxiliary character markings can be used with the present credit slips C, an improved credit slip shown in FIG. 3 at 50 enhances the likelihood that the bank copy will be marked without marking any of the other sheets. In the credit slip 50 gaps or apertures 52 are formed in alignment in all of the sheets except for the bank copy. This is shown in FIG. 4 wherein apertures 52a–52d are formed in alignment in all but the bottommost sheet 30. A clerk uses the credit slip in the usual manner, wherein he places the bottom of the credit card below the credit slip and moves a roller across the top of the slip to imprint the credit card number 16 onto all of the slips. It may be noted that the uppermost carbon copy sheet 32 has copy layers 53 on both of its faces, while the lowermost carbon 34 has a copy layer 54 on only its lower face. The clerk then uses a pen with its point projected through the aperture 52 in the sheets, to write the current auxiliary number shown as "20" on a predetermined area 56 on the lowermost sheet, with the area 56 in alignment with the holes 52. Clerks are encouraged to write this number only in this location because there is no need to lift the sheets, and because the bank will not give the merchant credit unless the auxiliary number appears on the bank record sheet. In FIG. 3, the date (6/16/87) is printed at 51 on the lower side of the uppermost sheet.

FIG. 6 shows another credit card 72, which is similar to that of the cards 10 of FIG. 1, except that it includes covers 74 over the auxiliary marking 76 and the corresponding calendar period 77. Each of the covers 74 is peelable, and serves to hide the auxiliary numbers that are to be used in the future. In the example shown in FIG. 6, the current period is between June 15 and June 30 and the currently valid auxiliary number is "72." On the first of July, the next cover 74a must be peeled off so that the then-current auxiliary number can be seen. In this way, an unscrupulous clerk is prevent from noting down a future number so as to provide time for making a counterfeit card which will be used during the period that the future number is valid. In addition, more auxiliary numbers are provided, each to last about 15 days, to further limit the time during which a swindler can obtain a current number, manufacture a fraudulent card, and use the card.

Figure 7:
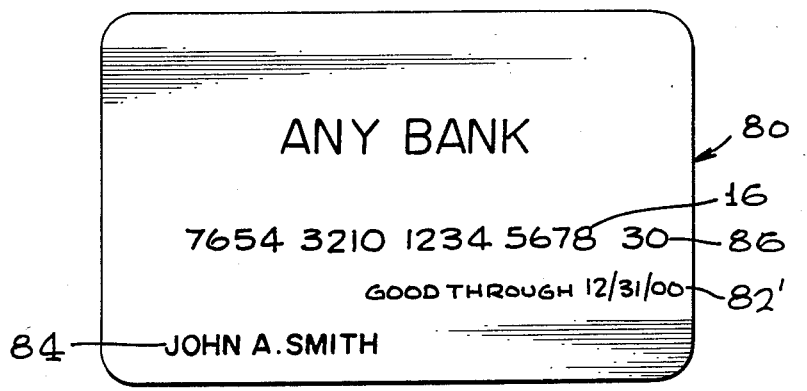
FIG. 7 is a plan view of a credit card constructed in accordance with yet another embodiment of the invention.
Figure 8:
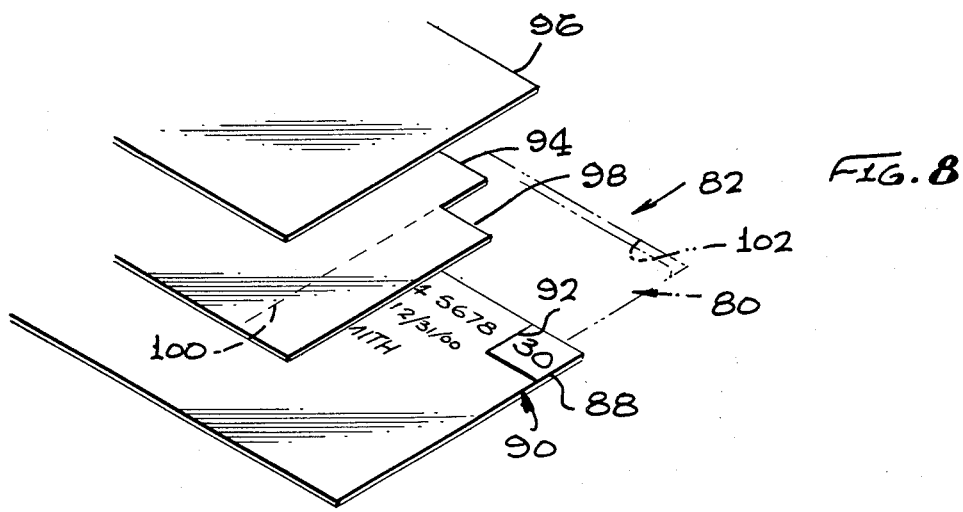
FIG. 8 is a partial perspective view of a credit card slip useful with the card of FIG. 7.

FIGS. 7 and 8 illustrate a credit card 80 and credit slip 82 that can be used to provide some safeguard against the use of a counterfeit card, while minimizing the efforts required of a clerk to print the auxiliary number onto the bank copy. In this system, the card 80 is similar to a present card which has a first set of raised characters at 16 representing the cardholder's number, raised characters at 82 representing the end of the card validity, and the raised area at 84 which is the cardholders' name. In card 80, there is also at least one raised character at 86 representing an auxiliary or security number, the particular number here being "30."

The way in which the raised auxiliary number 86 is printed is by forming a copy means 88 which is attached to the bank copy 90 of the credit slip and which covers a minority of the area of the bank record copy, and particularly the limited area 92 where the auxiliary number is expected to be pressed thereagainst. In FIG. 8, the copy means 88 is formed by integrating into or attaching onto the limited area 92 of the bank copy 90 a small tab of self-copy paper of a type manufactured by the 3M Company, wherein the surface of the tab includes numerous microscopic shells containing ink, and with the shells being broken by pressure applied thereto. A simpler but less elegant method is to paste a small tab of carbon paper, which has copy material only on its lower face, over the area 92. The carbon sheet 94 which lies between the bank record sheet 90 and the uppermost customer record sheet 96 has a gap so it is devoid of copy material at the region 98 which is aligned with the auxiliary number print area 92 on the bank sheet. This can be accomplished by forming the carbon copy sheet area 98 as a gap or cut-out, or by merely shortening the length of the copy sheet 94 along the line 100 to form a gap thereat. The card 80 and slip 90 are held in predetermined relative positions by a holding and marking machine 102.

The system of FIGS. 7 and 8 is advantageous because it does not require a clerk to have a writing instrument, and the auxiliary number can be printed in the same step as is used to print the cardholer number.

The numbers 40 on the credit card of FIG. 1 have been generated by the use of the following equation:

$$N = [C + KT]T^K + CT \qquad \text{Eq. 1}$$

where N equals a number whose last two digits equals the auxiliary number, constants C and K are each a digit between 0–9 which are chosen for that particular cardholder, and T is a particular period of time during which the auxiliary number is valid. In this example, $C=7$ and $K=1$; $T=1$ during the month of January, 2 during the month of February, and so forth until it equals 12 during the month of December (T can equal 13 during January of the following year and so forth). When these numbers are substituted for the letters in the above equation 1, a number of obtained whose last two digits equal the auxiliary number. For example, during the month of December the letter T equals 12. In that case, N=312, and the auxiliary number equals 12.

In FIG. 6, the same equation 1 is used, but with C=3, and K=4. Also, T=1 during the first fourteen days of January, T=2 during the rest of January, T=3 during the first fourteen days of February, etc. By the use of an equation to generate the numbers, the validation office does not have to keep track of all the auxiliary numbers and the period during which each one is valid for each cardholder, but instead has to keep track of only two numbers K and C assigned to that cardholder, and the formulas for that group of cardholders. In practice, the equations used by the validation office would be different for sufficient time intervals and groups of cardholders to assure that swindlers would not have sufficient information from previously obtained auxiliary numbers of many cardholders to solve the mathematics necessary to accurately predict any cardholder's future auxiliary numbers. Equation 1 is only one example of an equation that can be used. Another equation is given below:

$$N=[KT-C]T^K \qquad \text{Eq. 2}$$

where N is a number whose last two digits are the auxiliary number, K and C are constants assigned to a particular cardholder, and T is a number related to a date on which the auxiliary number is valid.

It is possible for a thief, who knows the auxiliary number that is valid for a particular time period such as one-half of a month, to make fraudulent transactions. It is of considerable use to law enforcement personnel to know that information as to the auxiliary number was obtained during a particular time period such as within a fifteen-day period. The law enforcement personnel can investigate legitimate transactions by the cardholder made during the period when the auxiliary number was valid, to determine where the thief might have obtained the auxiliary number. Since the cardholder may have made only one or a few transactions during that period, only a limited number of locations have to be investigated. Such investigations may turn up, for example, a situation where a clerk is writing the auxiliary number in a way so that it appears on the carbon copies instead of only on the bottommost copy. Thus, the use of auxiliary numbers tied to specific periods of time, can aid not only in reducing the occurrence of fraudulent transactions, but can also aid law enforcement personnel in investigating such transactions by isolating the few credit card purchases when the fraud could have occurred.

A greater degree of security can be obtained where the cardholder has a calculator with him which has a memory containing the cardholder's unique constants K and C and the calculator is programmed to calculate a new auxiliary number everyday. Thus, a calculator the size of a credit card (which may include keys for use as an ordinary calculator) can be programmed to calculate the auxiliary numbers using formulas similar to the above equations 1 and 2. The calculator also includes a clock which determines the date at the time of any transaction. The calculator might be programmed with eleven equations. The last digit of the solution of the first equation with the cardholder's unique values of C and K and the value of T corresponding to the current date would determine which of the remaining ten equations would be used to calculate the auxiliary number for that date. Thus, on the day of a transaction, a cardholder can press a key to obtain his then-current auxiliary number. On a particular date the calculator calculates the number by using the above equation 1, knowledge about the two constants K and C for that cardholder, and knowledge as to the present date. The verifying office will also be able to determine the auxiliary number for that date by knowledge about the constants and the formula for that date. The credit slip is marked with the date and the auxiliary number.

In another example, a particular cardholder is assigned digit 3 for the variable K and 6 for the variable C. On June 15, in the year 1985, the date can be represented as 6/15/5; the sum of these digits is 26, and for this case T equals 26. Placing these numbers in the formula for that date, equation 2, yields the equation $[KT-C]T^K=[3 \cdot 26-6]26^3=1,265,472$. The last two digits of this number are 72, which equals the auxiliary number on the date June 15, of the year 1985. By matching each cardholder to a particular pair of digits, the verifying office needs to retain less information, and yet can still determine the cardholder's proper auxiliary number for any given day of the year. It would be extremely difficult for a thief to determine the auxiliary number for any future date.

Thus, the invention provides credit cards and credit slips which resist counterfeiting of cards and their fraudulent use. This is accomplished by forming at least one auxiliary number of the credit card, which is to be marked on only the bank copy of the credit slip. The auxiliary numbers or other alpha-numerical characters can be marked on the cards so they do not project from a face of the card and they are not initially printed on the record sheets. A credit slip can be provided which has aligned apertures in all record and carbon copy sheets except for the bottommost sheet, the bank sheet, so a clerk can write directly through the aperture onto the bank record sheet. Where each card includes more than one auxiliary number, future numbers can be hidden by peelable covers that are peeled off by the credit cardholder or a clerk at the beginning of each period during which the auxiliary number is current. In another system, an auxiliary number can be raised, but the credit slip can be devoid of copy material at the position where the raised auxiliary character or characters lie, and a pressure sensitive copy means can be formed only on the bank record copy.

Although particular embodiments of the invention have been described and illustrated herein, it is recognized that modifications and variations may readily occur to those skilled in the art and consequently, it is intended that the claims be interpreted to cover such modifications and equivalents.

What is claimed is:

1. A fraud-resistant credit card and charge slip combination comprising:

a card having a pair of primarily flat faces, and having a plurality of regions projecting from one of said faces, each of said projecting regions representing a character, so the card can be used to mark a charge slip to form the characters thereon;

said card having a group of visually readable auxiliary character markings which do not project substantially from a surface of said card, and said card also having visually readable means for indicating a calendar period corresponding to each of said auxiliary character markings, whereby to indicate to the cardholder which auxiliary character marking is to be used on a given date;

a charge slip having a plurality of sheets which can be marked by said characters represented by said projecting regions, and which can be written upon to receive a marking represented by an auxiliary character marking.

2. The combination described in claim 1 wherein:

said charge slip includes a customer sheet, a bank sheet and a carbon sheet between said customer and bank sheets, said sheets lying facewise adjacent to each other and having markings thereon printed by said projecting characters;

said bank sheet having markings corresponding to a predetermined one of said auxiliary character markings, but said customer and carbon sheets being devoid of said predetermined auxiliary character markings.

3. The combination described in claim 1 including:

a plurality of peelable covers, each lying over one of said auxiliary character markings, to cover the auxiliary markings until it is time to use them.

4. The combination described in claim 1 where:

said group of auxiliary characters include a column of characters and an adjacent column of date indications which each indicate a period within a single year.

5. The combination described in claim 1 wherein:

said charge slip includes at least three sheets including a first customer sheet, a second carbon sheet, and a third bank sheet;

said first and second sheets having aligned holes at a particular region, but said third bank sheet having a sheet portion aligned with said holes, so when the first sheet is uppermost, a person can project the point of a writing instrument through said aligned holes to write on said sheet portion of said third bank sheet, whereby an auxiliary character marking can be easily written on only the third bank sheet.

6. A fraud-resistant card and charge slip combination, comprising:

a card having raised characters;

a group of sheets lying facewise adjacent to one another, including an uppermost record sheet, a bottommost bank record sheet, and a copy sheet disposed immediately above said bank sheet, said card being pressable facewise against said group of sheets to mark said sheets with marks corresponding to said raised characters;

said group of sheets, except said bank record sheet, forming aligned gaps which permit a marking device applied through the region of said holes, to mark said bank sheet but not the other sheets;

said raised characters on said card represent a cardholder number, and said raised characters also include an auxiliary character which is positioned to lie at said aligned gaps to mark said bottommost sheet when pressed thereagainst with said bottommost sheet being markable at the area of said gaps.

7. A group of fraud-resistant credit card devices, comprising:

a plurality of cards each having a pair of primarily flat faces and having a plurality of regions projecting from one of said faces, each of said projecting regions representing a character, so the card can be used to mark a slip of paper to form the characters thereon, each card having projecting regions representing a unique multi-digit card-holder number;

each of said cards having at least one unique character marking which is substantially unique to the card, and which does not project substantially from a surface of said card; and a charge slip which includes a customer sheet, a bank sheet, and a carbon sheet between said customr and bank sheets, said sheets lying facewise adjacent to each other and having markings thereon printed by said projecting characters;

said bank sheet having a marking corresponding to said auxiliary character marking, but said customer and carbon sheets being devoid of said predetermined auxiliary character marking.

8. A combination of fraud-resistant credit card devices and charge slips comprising:

a plurality of charge slips which can each be marked by projections of a credit card pressed thereagainst;

a multiplicity of credit card devices, each having a plurality of projections which can mark a charge slip when the card device is pressed thereagainst, said plurality of projections of each card device identifying a unique cardholder number that has at least seven digits, each of said card devices also having means for indicating a set of auxiliary numbers that each have less than seven digits and that are each related to a predetermined time period that is no more than one month in duration, each set of auxiliary numbers being substantially unique to a particular card device;

each of a plurality of said card devices having a set of auxiliary numbers, wherein each of the auxiliary numbers is generated by a known mathematical equation having a plurality of variables with at least one related to said predetermined time period, but with the value of at least one other variable being substantially unique to each card device of said plurality of card devices, whereby a verification authority need only know the equation and the at least one unique variable unique to a card device to determine a valid authorization number for that card device at a particular time.

* * * * *